United States Patent
Hanna et al.

(10) Patent No.: US 7,014,017 B2
(45) Date of Patent: Mar. 21, 2006

(54) ELECTRONIC PARKING BRAKE ACTUATING ASSEMBLY

(75) Inventors: Ronald J. Hanna, Mancelona, MI (US); Michael A. Slumba, Clarkston, MI (US); Andrew B. Turner, Auburn Hills, MI (US); Bryan D. Powrozek, Sterling Heights, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/881,298

(22) Filed: Jun. 30, 2004

(65) Prior Publication Data

US 2006/0000679 A1    Jan. 5, 2006

(51) Int. Cl.
*F16C 1/16* (2006.01)

(52) U.S. Cl. .................. 188/2 D; 188/158; 188/77 W; 188/216; 188/82.6; 188/162

(58) Field of Classification Search ............... 188/2 D, 188/162, 158, 82.6, 77 W, 156, 72.8, 72.1, 188/72.3, 216, 265; 74/501.5 R, 625, 502.4, 74/502.6; 192/219.4
See application file for complete search history.

(56) References Cited

U.S. PATENT DOCUMENTS

| | | | | |
|---|---|---|---|---|
| 4,804,073 A | * | 2/1989 | Taig et al. | 188/72.1 |
| 4,817,463 A | * | 4/1989 | Cameron | 475/154 |
| 5,004,077 A | * | 4/1991 | Carlson et al. | 188/2 D |
| 5,827,149 A | * | 10/1998 | Sponable | 477/92 |
| 6,244,394 B1 | * | 6/2001 | Gutierrez et al. | 188/72.8 |
| 6,386,338 B1 | * | 5/2002 | Powrozek | 188/156 |
| 6,533,082 B1 | * | 3/2003 | Gill et al. | 188/156 |
| 6,609,595 B1 | * | 8/2003 | Flynn et al. | 188/156 |
| 6,619,439 B1 | * | 9/2003 | Gibson | 188/2 D |
| 6,755,284 B1 | * | 6/2004 | Revelis et al. | 188/2 D |
| 6,782,978 B1 | * | 8/2004 | Tachiiri et al. | 188/157 |
| 6,802,398 B1 | * | 10/2004 | Drennen et al. | 188/2 D |
| 6,840,133 B1 | * | 1/2005 | Aubrey et al. | 74/531 |
| 6,851,525 B1 | * | 2/2005 | Baier-Welt et al. | 188/156 |
| 2005/0000762 A1 | * | 1/2005 | Powrozek et al. | 188/162 |

FOREIGN PATENT DOCUMENTS

| | | | |
|---|---|---|---|
| EP | 1462330 A2 | * | 9/2004 |
| WO | WO 98/56633 | * | 12/1998 |
| WO | WO 02/095256 A2 | * | 11/2002 |
| WO | WO 03/068576 A1 | * | 8/2003 |
| WO | WO 04/043753 A1 | * | 5/2004 |
| WO | WO 04/044445 A2 | * | 5/2004 |

* cited by examiner

*Primary Examiner*—Xuan Lan Nguyen
(74) *Attorney, Agent, or Firm*—Banner & Witcoff; Peter D. McDermott; Dean B. Watson

(57) ABSTRACT

An actuating assembly for an electronic parking brake includes a housing and motor secured to the housing and having an output shaft. A cable assembly is rotatably driven by the motor. A cable is anchored at a first end to the cable assembly and wraps around the cable assembly as the cable assembly rotates in a first direction. A first spring is secured to the cable assembly such that it is rotatable with the cable assembly. A drum receives the first spring, which is engageable with an interior surface of the drum to prevent rotation of the cable assembly. A plurality of grooves is formed on a surface of the drum. At least one roller element is positioned in a groove of the drum. A spring housing receives the drum and is secured to the housing. Each of a plurality of apertures in the spring housing receives a roller element.

20 Claims, 2 Drawing Sheets

ELECTRONIC PARKING BRAKE ACTUATING ASSEMBLY

FIELD OF THE INVENTION

This invention relates generally to electronic parking brakes, and, in particular, to electronic parking brakes with improved actuating assemblies.

BACKGROUND OF THE INVENTION

Electronic parking brakes are well known in the automotive industry. Known electronic parking brake systems have an actuating assembly that uses a screw, which is actuated by a motor, to move a cable in linear fashion to apply the parking brake. Such electronic parking brake assemblies require a significant package size to accommodate the linear travel of the screw and cable. It would be desirable to provide an electronic parking brake that has a more compact design.

It is an object of the present invention to provide an electronic parking brake actuating assembly that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide an electronic parking brake with an improved actuating assembly. In accordance with a first preferred embodiment, an actuating assembly for an electronic parking brake includes a housing and motor secured to the housing and having an output shaft. A cable assembly is rotatably driven by the motor. A cable is anchored at a first end to the cable assembly and wraps around the cable assembly as the cable assembly rotates in a first direction. A first spring is secured to the cable assembly such that it is rotatable with the cable assembly. A drum receives the first spring, which is engageable with an interior surface of the drum to prevent rotation of the cable assembly. A plurality of grooves is formed on a surface of the drum. At least one roller element is positioned in a groove of the drum. A spring housing receives the drum and is secured to the housing. Each of a plurality of apertures in the spring housing receives a roller element.

In accordance with another preferred embodiment, an actuating assembly for an electronic parking brake includes a housing, and a motor positioned within and secured to the housing and having an output shaft. A gear assembly comprises three planetary gear sets and is driven by the output shaft. A cable assembly comprises an outer ring having a plurality of teeth on a radially interior surface thereof and a groove in a radially exterior surface thereof; an annular insert having a first portion and a second portion, with a plurality of teeth being formed on an exterior surface of the first portion that engage the teeth of the outer ring, and with the second portion having a cutout segment; and an annular cam member having a plurality of teeth on an inner surface thereof that mate with a spline gear of a third planetary gear set of the gear assembly and a cam portion mating with the cutout portion of the annular insert. A cable is anchored at a first end thereof to the cable assembly, with the groove receiving a portion of the cable and the cable wrapping around the cable assembly as the cable assembly rotates in a first direction. A first spring is secured to the cable assembly such that the first spring is rotatable with the cable assembly. A drum receives the first spring, with the first spring engageable with an interior surface of the drum to prevent rotation of the cable assembly. A plurality of grooves is formed on a surface of the drum. Each of a plurality of ball bearings is positioned in a groove of the drum. A spring housing receives the drum and is secured to the housing. The spring housing has a plurality of apertures, with each aperture receiving a ball bearing. A release ring is rotatable about an exterior surface of the spring housing and has a plurality of recesses formed therein. A release spring is rotatable about the spring housing, with a first end of the release spring being attached to the release ring, a second end of the release spring being attached to the spring housing, and the release spring preventing rotation of the release ring with respect to the spring housing in an operating condition. Each recess receives a ball bearing when the release spring is rotated with respect to the spring housing in a manual release condition and each recess is aligned with an aperture of the spring housing. A release member is connected to the release ring and is configured to allow a user to rotate the release ring with respect to the spring housing in the manual release condition.

In accordance with a further embodiment, an actuating assembly for an electronic parking brake includes a housing, and a motor positioned within and secured to the housing and having an output shaft with a gear secured thereto. A gear assembly has three planetary gears sets, with a first planetary gear set being driven by the gear of the output shaft. A cable assembly comprises an outer ring having a plurality of teeth on a radially interior surface thereof and a groove in a radially exterior surface thereof; an annular insert having a first portion and a second portion, with a plurality of teeth being formed on an exterior surface of the first portion that engage the teeth of the outer ring, and with the second portion having a cutout segment; and an annular cam member having a plurality of teeth on an inner surface thereof that mate with a spline gear of a third planetary gear set of the gear assembly and a cam portion mating with the cutout portion of the annular insert. A cable is anchored at a first end thereof to the cable assembly, with the groove receiving a portion of the cable and the cable wrapping around the cable assembly as the cable assembly rotates in a first direction. A first spring is secured to the cable assembly such that the first spring is rotatable with the cable assembly. A drum receives the first spring, with the first spring being engageable with an interior surface of the drum to prevent rotation of the cable assembly. A plurality of grooves is formed on a surface of the drum. Each of a pair of ball bearings is positioned in a groove of the drum. A spring housing receives the drum and is secured to the housing, with the spring housing having a pair of apertures, each of which receives a ball bearing. A release ring is rotatable about an exterior surface of the spring housing and has a pair of recesses formed therein. A release spring is rotatable about the spring housing, with a first end of the release spring being attached to the release ring, and a second end of the release spring being attached to the spring housing. The release spring prevents rotation of the release ring with respect to the spring housing in an operating condition. Each recess receives a ball bearing when the release spring is rotated with respect to the spring housing in a manual release condition and each recess is aligned with an aperture of the spring housing. A release member is connected to the release ring and is configured to allow a user to rotate the release ring with respect to the spring housing in the manual release condition.

Substantial advantage is achieved by providing an electronic parking brake with an improved actuating assembly. In particular, certain preferred embodiments of the present invention provide a design that is more compact, and reduces complexity and cost.

These and additional features and advantages of the invention disclosed here will be further understood from the following detailed disclosure of certain preferred embodiments.

Figure 1:
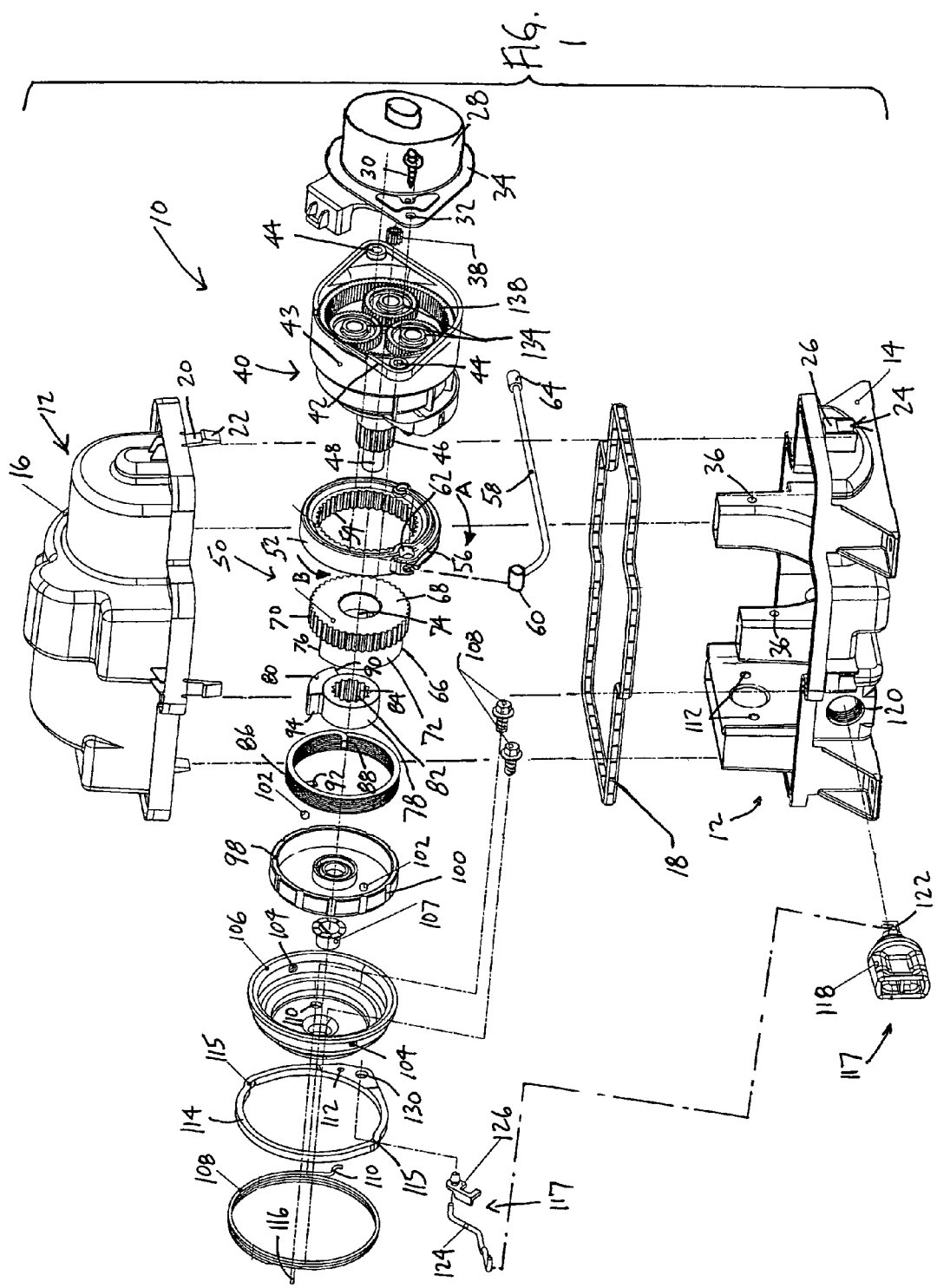
FIG. 1 is a perspective view, in exploded form, of an electronic parking brake actuating assembly in accordance with a preferred embodiment of the present invention.

The figures referred to above are not drawn necessarily to scale and should be understood to provide a representation of the invention, illustrative of the principles involved. Some features of the electronic parking brake actuating assembly depicted in the drawings have been enlarged or distorted relative to others to facilitate explanation and understanding. The same reference numbers are used in the drawings for similar or identical components and features shown in various alternative embodiments. Electronic parking brake actuating assemblies as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of an actuating assembly 10 for an electronic parking brake for a vehicle is shown in FIG. 1. Actuating assembly 10 includes a housing 12 having a first portion 14 and a second portion 16 secured to first portion 14. In a preferred embodiment, a resilient gasket 18 is positioned between first portion 14 and second portion 16 to provide protection for the components within housing 12. Gasket 18 may be formed of, for example, silicone or neoprene. Other suitable materials for gasket 18 will become readily apparent to those skilled in the art, given the benefit of this disclosure.

In a preferred embodiment, second portion 16 of housing 12 includes a plurality of tabs 20, each of which has a shoulder 22 with a tapered outer surface. Tabs 20 are received in snap-fit fashion by apertures 24 formed in first portion 14 of housing 12. As tabs 20 are inserted into apertures 24, tabs 20 are bent inwardly by engagement of the tapered surface of shoulders 22 with edges 26 of apertures 24. Once shoulders 2 pass by edges 26 of apertures 24, tabs 20 snap back to their original position, locking second portion 16 to first portion 14.

A motor 28 is secured to housing 12 by way of fasteners 30. In the illustrated embodiment, the fasteners are bolts 30 (only one of which is visible in FIG. 1), which extend through apertures 32 formed in a mounting flange 34 of motor 28. Bolts 30 are threaded into threaded apertures 36 formed in first portion 14 of housing 12.

A pinion gear 38 is secured to an output shaft (not visible) of motor 28. Pinion gear 38 interfaces with and rotatably drives a gear assembly 40, described in greater detail below. A flange 42 of a housing 43 of gear assembly 40 includes a pair of apertures 44 through which bolts 30 extend, securing gear assembly 40 to motor 28 and housing 12. A spline gear 46 is mounted on a shaft 48 of gear assembly 40 and acts as the output of gear assembly 40.

Spline gear 46 engages and rotatably drives a cable assembly 50. Cable assembly 50 includes an outer ring 52 having a plurality of teeth 54 formed on its radially interior surface. A groove 56 is formed on the radially exterior surface of outer ring 52 and receives a cable 58. A knob 60 at a first end of cable 58 is received in an aperture 62 formed in outer ring 52 at an end of groove 56 to anchor cable 58 to outer ring 52. A second end 64 of cable 58 is secured in known fashion to the brakes of a vehicle by way of an equalizer bracket that connects to two brake cables (not shown here). As cable assembly 50 is rotatably driven in the direction of arrow A (clockwise as seen here), cable 58 is wrapped about outer ring 52, engaging the parking brake of the vehicle.

An annular insert 66 has a first portion 68 having a plurality of teeth 70 on a radially exterior surface thereof that engage and mesh with teeth 54 on outer ring 52. A second portion 72 of annular insert 66 has an aperture 74 extending therethrough and a cutaway portion 76. A cam member 78 is positioned within aperture 74. A camming segment 80 extends radially outward along a portion of the circumference of cam member 78. Camming segment 80 is received by cutaway portion 76 of annular insert 66. Cam member 78 has an aperture 82 extending therethrough. Aperture 82 includes a plurality of teeth 84 that mesh with and are driven by spline gear 46 to rotate cam member 78.

Figure 2:
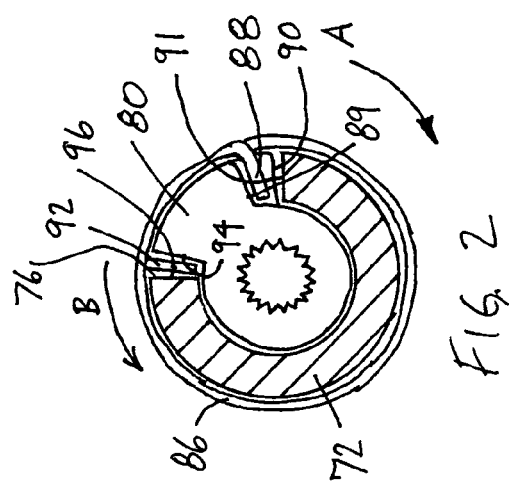
FIG. 2 is a section view of a portion of a cable assembly of the actuating assembly of FIG. 1.

A first coil spring 86 is seated about second portion 72 and camming segment 80. As seen more clearly in FIG. 2, a first end 88 of first coil spring 86 is bent radially inward and received in a recess 89 formed in a first face 90 of camming segment 80 and proximate a first face 91 of second portion 72. A second end 92 of first coil spring 86 is bent radially inward and positioned between a second face 94 of camming segment 80 and a second face 96 of cutaway portion 76.

A drum 98 is positioned over first coil spring 86. In its steady state condition, first coil spring 86 naturally expands outwardly against the interior surface of drum 98. By engaging the interior surface of drum 98, first coil spring 86 acts as a clutch to prevent rotational movement of cable assembly 50 with respect to drum 98. When camming segment 80 is driven by motor 28 and gear assembly 40 in the direction of arrow A during normal engagement of the parking brake, first end 88 of first coil spring 86 is engaged by recess 89 and forced to move in the direction of arrow A, acting to release the pressure of first coil spring 86 on drum 98 and allowing cable assembly 50 to rotate with respect to drum 98. As cable assembly 50 rotates in the direction of arrow A, as noted above, cable 58 is wound about outer ring 52, engaging the parking brake of the vehicle. When power to motor 28 is removed, the clutch action of first coil spring 86 on drum 98 prevents retraction of cable 58.

When motor 28 is driven in the reverse direction during normal operation, second face 94 of camming member 80 engages second end 92 of first coil spring 86, moving it in the direction of arrow B (counterclockwise as seen here). As second end 92 of first coil spring 86 moves, the pressure it naturally exerts on the interior surface of drum 98 is released, allowing cable assembly 50 to rotate with respect to drum 98. As cable assembly 50 rotates in the direction of arrow B, cable 58 is unwound from outer ring 52, thereby disengaging the parking brake of the vehicle.

Drum 98 includes a plurality of axially extending grooves 100 formed in its radially exterior surface. At least one roller element such as a ball bearing 102 is positioned in a corresponding groove 100. It is to be appreciated that in other preferred embodiments, the roller elements may have other shapes, such as cylindrical rollers. Suitable shapes for the roller elements will become readily apparent to those skilled in the art, given the benefit of this disclosure.

In the illustrated embodiment, a pair of ball bearings 102 is positioned in a pair of opposed grooves 100. Ball bearings 102 are also positioned within an opposed pair of apertures 104 formed in a wall of a spring housing 106 within which drum 98 is disposed. It is to be appreciated that in certain preferred embodiments, more than two ball bearings 102 may be positioned in corresponding grooves 100.

Spring housing 106 is secured to housing 12 by way of a pair of threaded bolts 108 that extend through a pair of apertures 110 (only one of which is visible) formed in spring housing 106 and which are threadingly received in a pair of threaded apertures 112 formed in first portion 14 of housing 12. A bearing 107 is positioned between drum 98 and spring housing 106 and serves to support shaft 48 of gear assembly 40.

Apertures 104 are sized such that ball bearings 102 may pass freely therethrough. However a ring 114 surrounds spring housing 106 and prevents ball bearings 102 from passing outward through apertures 104, maintaining ball bearings within apertures 104 and grooves 100. Ring 114 includes a pair of recesses 115, which are not aligned with apertures 104 of spring housing 106 during normal operation.

A second coil spring 108 surrounds ring 114. A first end 110 of second coil spring 108 extends through an aperture 112 in ring 114, thereby securing second coil spring 108 to ring 114. In a preferred embodiment, first end 110 is bent axially outwardly approximately 90° and then bent again approximately 90° such that it extends substantially parallel with the rings of second coil spring 108. A second end 116 of second coil spring 108 is secured to spring housing 106. Second coil spring 108 maintains ring 114 rotationally fixed with respect to spring housing 106 during normal operation.

A manual release assembly 117 includes a lever 118 that is threadingly received in an aperture 120 formed in first portion 14 of housing 12. A distal end 122 of release lever 118 is pivotally connected to a release rod 124, which is in turn connected to a clip 126 with a projection 128 that extends through an aperture 130 formed in ring 114. When there is a loss of power to motor 28, the parking brake can be released with manual release assembly 117. A user unscrews release lever 118 from first portion 14 and then pulls out on release lever 118, which rotates ring 114 until recesses 115 are aligned with apertures 104 of spring housing 106. At this point, ball bearings 102 are free to move radially outward out of grooves 100 in drum 98 through apertures 104 into recesses 115. With ball bearings 102 no longer holding drum 98 in fixed position with respect to drum housing 106, the pressure on cable 58 will pull gear assembly 50, first coil spring 86, and drum 98 in the direction of arrow B, allowing cable 58 to retract to its static condition, thereby releasing the parking brake. It is to be appreciated that in certain preferred embodiments manual release assembly 117 could comprises a light duty cable connected to spring housing 106, and even a spring return light duty cable, which would eliminate the need for second coil spring 108.

It is to be appreciated that in certain preferred embodiments, grooves 100 could be formed on the interior surface of drum 98, with second spring 108, ring 114 and manual release assembly 117 being internal to actuating assembly 10.

Figure 3:
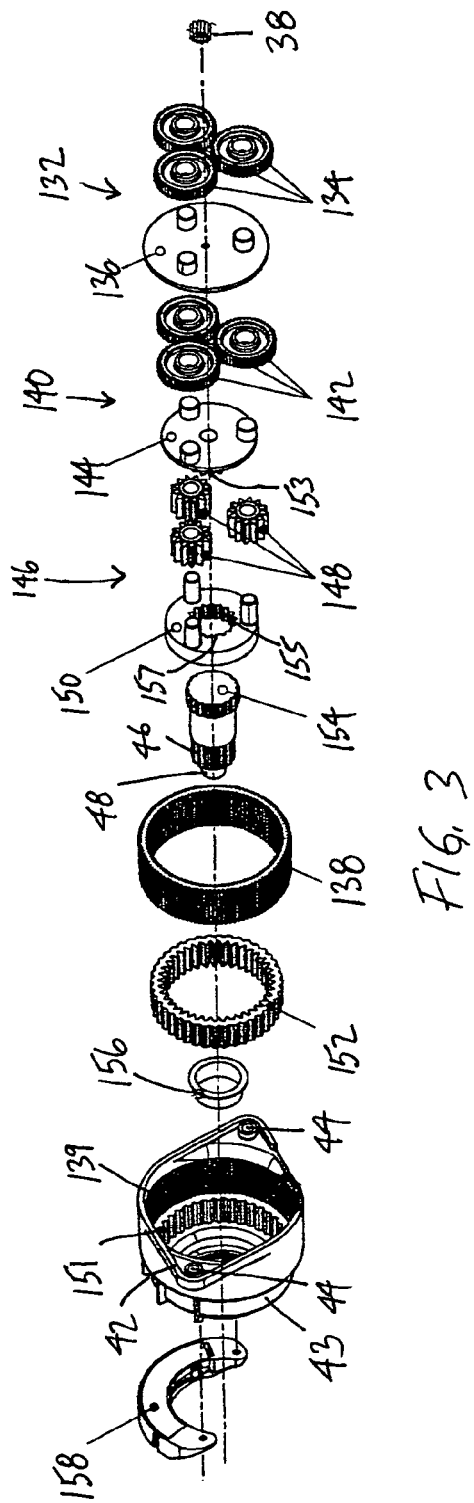
FIG. 3 is a perspective view, in exploded form, of a preferred embodiment of a gear assembly of the actuating assembly of FIG. 1.

In a preferred embodiment, as illustrated in FIG. 3, gear assembly 40 has three sets of planetary gears. Pinion gear 38 serves as the sun gear for a first planetary gear set 132, which includes three planet gears 134, a carrier 136 and a ring gear 138. The teeth on the exterior of ring gear 138 mesh with a first set of teeth 139 formed on an interior of housing 43. A second planetary gear set 140 includes three planet gears 142 and a carrier 144. Second planetary gear set 140 shares ring gear 138 with first planetary gear set 132. A third planetary gear set 146 includes three planet gears 148, a carrier 150, and a ring gear 152. The teeth on the exterior of ring gear 152 mesh with a second set of teeth 151 formed on an interior of housing 43. An output gear 153 on carrier 144 of second planetary gear set 140 acts as the sun gear for third planetary gear set 146, meshing with planet gears 148. An output gear 154 for third planetary gear set 146 is mounted on shaft 48 and meshes with a set of teeth 155 formed on an aperture 157 of carrier 150, transferring power to spline gear 46 on shaft 48. Gear assembly 40 also includes a bearing 156 to support shaft 48. A position sensor 158, which monitors the position of outer ring 52, is secured to an exterior of housing 43.

It is to be appreciated that gear assembly 40 need not include three sets of planetary gears, and that this is merely an exemplary embodiment. Gear assembly 40 can comprise any combination of gears that will transfer rotational power from motor 28 to cable assembly 50.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. An actuating assembly for an electronic parking brake comprising, in combination:
   a housing;
   a motor positioned within and secured to the housing and having an output shaft;
   a cable assembly rotatably driven by the motor;
   a cable anchored at a first end to the cable assembly, the cable wrapping around the cable assembly as the cable assembly rotates in a first direction;
   a first spring secured to the cable assembly such that the first spring is rotatable with the cable assembly;
   a drum receiving the first spring, the first spring engageable with an interior surface of the drum to prevent rotation of the cable assembly, a plurality of grooves formed on a surface of the drum;
   at least one roller element, each roller element positioned in a groove of the drum; and
   a spring housing receiving the drum and secured to the housing, the spring housing having a plurality of apertures, each aperture receiving a roller element.

2. The actuating assembly of claim 1, further comprising a gear assembly rotatably driven by the motor and which rotatably drives the cable assembly.

3. The actuating assembly of claim 2, wherein the gear assembly includes a plurality of planetary gears.

4. The actuating assembly of claim 2, wherein the gear assembly includes three sets of planetary gears.

5. The actuating assembly of claim 4, wherein a sun gear of a first of the planetary gears is driven by the output shaft of the motor, the first and second planetary gear sets share a ring gear, an output gear of the second planetary gear set forms a sun gear for the third planetary gear set, and a spline gear driven by the third planetary gear drives the cable assembly.

6. The actuating assembly of claim 2, wherein the cable assembly comprises:
  an outer ring having a plurality of teeth on a radially interior surface thereof and a groove in a radially exterior surface thereof, the groove receiving the first end and a portion of the cable;
  an annular insert having a first portion and a second portion, a plurality of teeth formed on an exterior surface of the first portion that engage the teeth of the outer ring, the second portion having a cutout segment; and
  an annular cam member having a plurality of teeth on an inner surface thereof that mate with a spline gear formed on the gear assembly and a cam portion mating with the cutout portion of the annular insert.

7. The actuating assembly of claim 6, wherein each of first and second ends of the first spring are bent radially inward and are engaged by the second portion and the cam portion.

8. The actuating assembly of claim 7, wherein the cam portion includes a recess that receives the tab on the first end of the first spring.

9. The actuating assembly of claim 7, wherein the second end is captured between a face of the cam portion and a face of the second portion.

10. The actuating assembly of claim 2, wherein the gear assembly includes a position sensor.

11. The actuating assembly of claim 1, wherein the grooves are formed on a radially outward surface of the drum.

12. The actuating assembly of claim 1, wherein the housing comprises a first portion and a second portion secured to the first portion, with a gasket disposed between the first and second portions.

13. The actuating assembly of claim 1, wherein a pair of roller elements is positioned in opposed grooves of the drum.

14. The actuating assembly of claim 1, further comprising a manual release assembly connected to the spring housing.

15. The actuating assembly of claim 14, wherein the manual release assembly comprises:
  a release ring rotatable about an exterior surface of the spring housing and having a plurality of recesses;
  a release spring rotatable about the spring housing, a first end of the release spring attached to the release ring, a second end of the release spring attached to the spring housing, the release spring preventing rotation of the release ring with respect to the spring housing in an operating condition, each recess receiving a roller element when the release spring is rotated with respect to the spring housing in a manual release condition and each recess is aligned with an aperture of the spring housing; and
  a release member connected to the release ring and configured to allow a user to rotate the release ring with respect to the spring housing in the manual release condition.

16. The actuating assembly of claim 15, wherein the release ring includes an aperture through which a first end of the release spring extends and the spring housing includes an aperture through which a second end of the release spring extends.

17. The actuating assembly of claim 15, wherein the release member includes a lever threadingly engaging an aperture in the housing.

18. The actuating assembly of claim 1, wherein each roller element is a ball bearing.

19. An actuating assembly for an electronic parking brake comprising, in combination:
  a housing;
  a motor positioned within and secured to the housing and having an output shaft;
  a gear assembly comprising three planetary gear sets and driven by the output shaft;
  a cable assembly comprising
    an outer ring having a plurality of teeth on a radially interior surface thereof and a groove in a radially exterior surface thereof;
    an annular insert having a first portion and a second portion, a plurality of teeth formed on an exterior surface of the first portion that engage the teeth of the outer ring, the second portion having a cutout segment; and
    an annular cam member having a plurality of teeth on an inner surface thereof that mate with a spline gear of a third planetary gear set of the gear assembly and a cam portion mating with the cutout portion of the annular insert;
  a cable anchored at a first end to the cable assembly, the groove receiving a portion of the cable, the cable wrapping around the cable assembly as the cable assembly rotates in a first direction;
  a first spring secured to the cable assembly such that the first spring is rotatable with the cable assembly;
  a drum receiving the first spring, the first spring engageable with an interior surface of the drum to prevent rotation of the cable assembly, a plurality of grooves formed on a surface of the drum;
  a plurality of ball bearings, each ball bearing positioned in a groove of the drum;
  a spring housing receiving the drum and secured to the housing, the spring housing having a plurality of apertures, each aperture receiving a ball bearing;
  a release ring rotatable about an exterior surface of the spring housing and having a plurality of recesses formed therein;
  a release spring rotatable about the spring housing, a first end of the release spring attached to the release ring, a second end of the release spring attached to the spring housing, the release spring preventing rotation of the release ring with respect to the spring housing in an operating condition, each recess receiving a ball bearing when the release spring is rotated with respect to the spring housing in a manual release condition and each recess is aligned with an aperture of the spring housing; and
  a release member connected to the release ring and configured to allow a user to rotate the release ring with respect to the spring housing in the manual release condition.

20. An actuating assembly for an electronic parking brake comprising, in combination:
- a housing;
- a motor positioned within and secured to the housing and having an output shaft with a gear secured thereto;
- a gear assembly having three planetary gears sets, a first planetary gear set being driven by the gear of the output shaft;
- a cable assembly comprising
    - an outer ring having a plurality of teeth on a radially interior surface thereof and a groove in a radially exterior surface thereof;
    - an annular insert having a first portion and a second portion, a plurality of teeth formed on an exterior surface of the first portion that engage the teeth of the outer ring, the second portion having a cutout segment; and
    - an annular cam member having a plurality of teeth on an inner surface thereof that mate with a spline gear of a third planetary gear set of the gear assembly and a cam portion mating with the cutout portion of the annular insert;
- a cable anchored at a first end to the cable assembly, the groove receiving a portion of the cable, the cable wrapping around the cable assembly as the cable assembly rotates in a first direction;
- a first spring secured to the cable assembly such that the first spring is rotatable with the cable assembly;
- a drum receiving the first spring, the first spring engageable with an interior surface of the drum to prevent rotation of the cable assembly, a plurality of grooves formed on a surface of the drum;
- a pair of ball bearings, each ball bearing positioned in a groove of the drum;
- a spring housing receiving the drum and secured to the housing, the spring housing having a pair of apertures, each aperture receiving a ball bearing;
- a release ring rotatable about an exterior surface of the spring housing and having a pair of recesses formed therein;
- a release spring rotatable about the spring housing, a first end of the release spring attached to the release ring, a second end of the release spring attached to the spring housing, the release spring preventing rotation of the release ring with respect to the spring housing in an operating condition, each recess receiving a ball bearing when the release spring is rotated with respect to the spring housing in a manual release condition and each recess is aligned with an aperture of the spring housing; and
- a release member connected to the release ring and configured to allow a user to rotate the release ring with respect to the spring housing in the manual release condition.

* * * * *